Dec. 13, 1966 N. A. WILSON 3,290,913
INFRARED MICROMETER MOUNTING MEANS
Filed Feb. 4, 1964 3 Sheets-Sheet 3
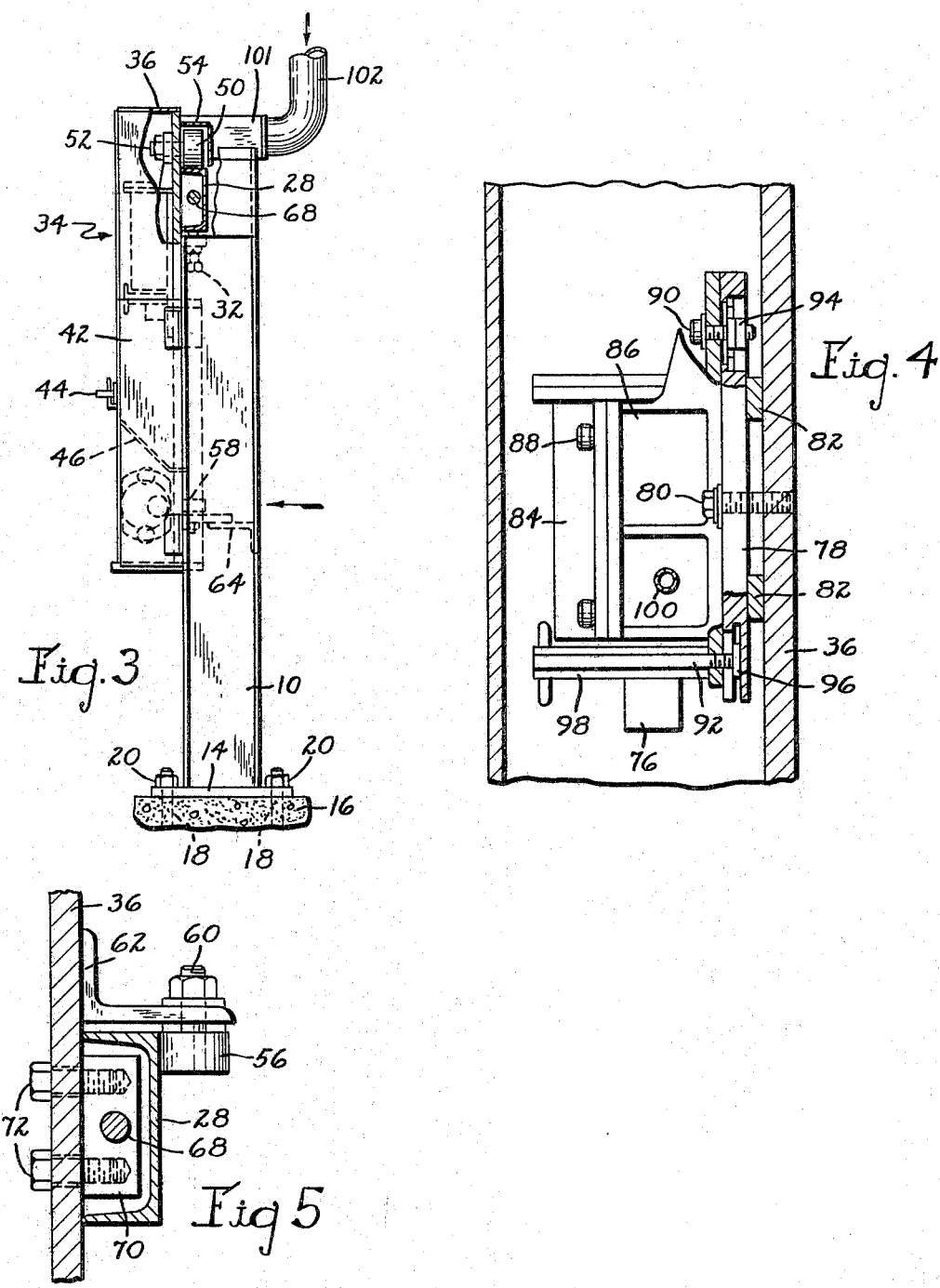
INVENTOR.
Norman A. Wilson
BY
Russell, Chittick & Pfund
Attorneys

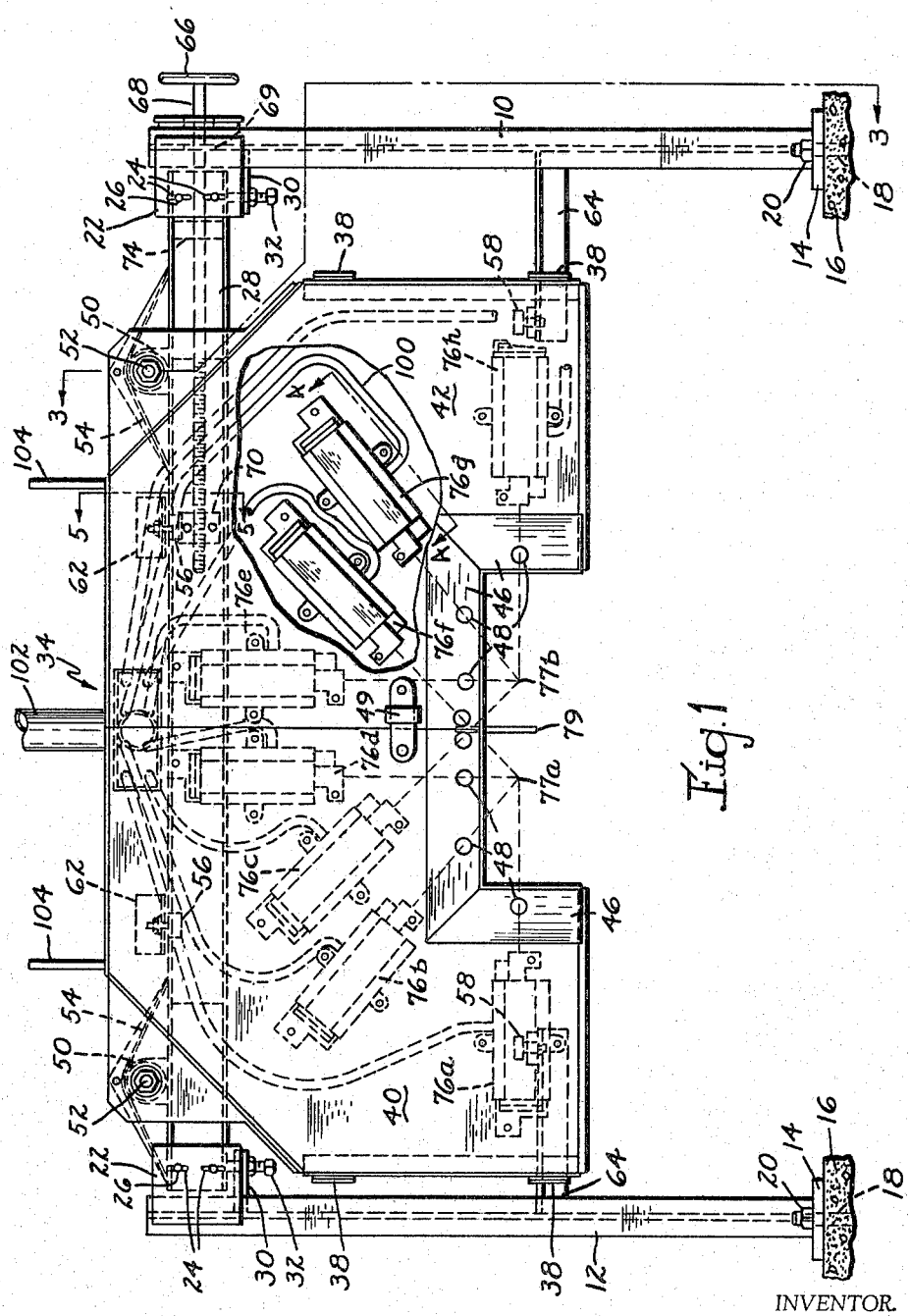

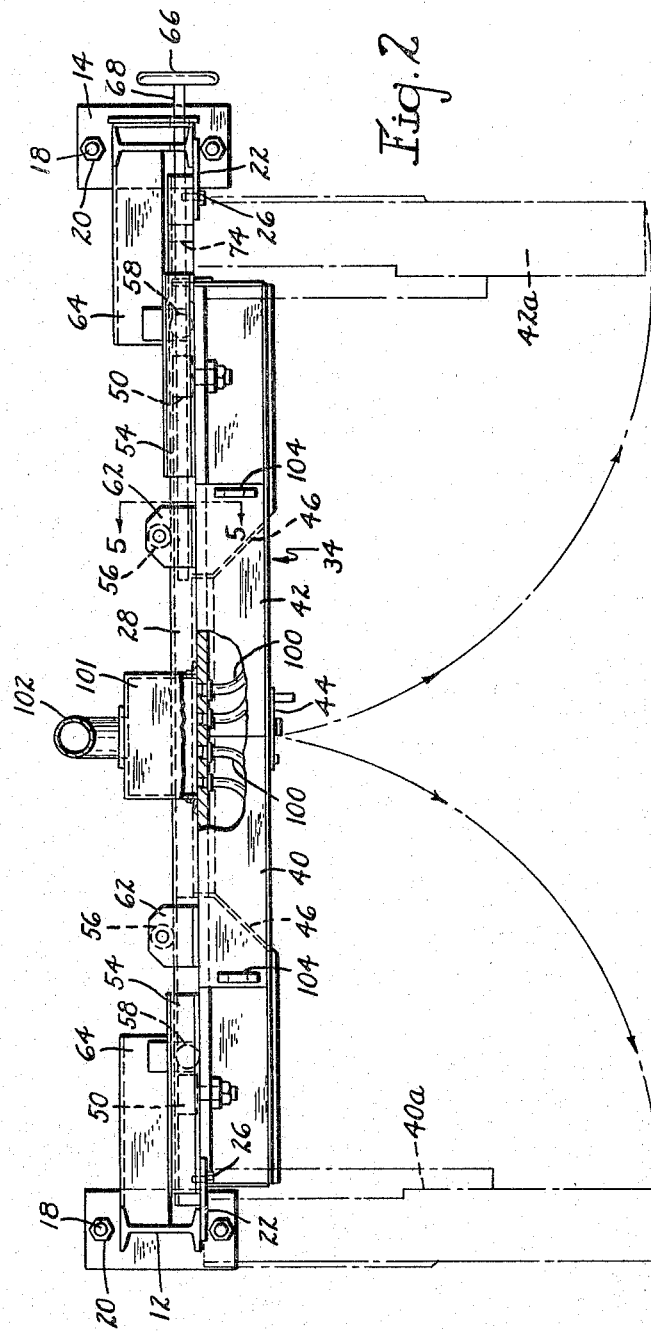

United States Patent Office 3,290,913
Patented Dec. 13, 1966

3,290,913
INFRARED MICROMETER MOUNTING MEANS
Norman A. Wilson, Westboro, Mass., assignor to Morgan Construction Company, Worcester, Mass., a corporation of Massachusetts
Filed Feb. 4, 1964, Ser. No. 342,444
8 Claims. (Cl. 72—12)

This invention relates to rolling mills and more particularly to an improved means of mounting rod measuring means adjacent to the pass line of a multi-strand rolling mill.

Efforts are constantly being made to increase the productive capacity of rolling mills by increasing their operational speeds. However, it is well known that as rolling speeds become greater, production problems gain in complexity and equipment malfunctions become more serious. For example, when running a mill at a finished rod delivery speed of approximately 7,000 feet per minute, improper roll adjustments can result in the production of considerable quantities of off-gauge rod unless corrective adjustments are made without undue delay. Experience has shown that operating personnel are frequently incapable of reacting with sufficienut rapidity when roll adjustments are required in mills operating at these high speeds. It has therefore become both desirable and necessary to devise automatic high speed control systems capable of instantaneously reacting to off-gauge variations in the product being rolled. These systems often include rod measuring devices such as infrared micrometers for continuously gauging the rod being produced at selected intervals along the pass line. The infrared micrometers emit control signals representative of rod gauge which are utilized in continuously adjusting the various mill stands.

Although infrared micrometers are excellently adapted for continuously and accurately measuring rapidly moving rod, difficulties have been encountered in developing suitable apparatus for mounting the micrometers in positions closely adjacent to the path of the moving rod. More particularly, means must be provided for adjusting the position of each micrometer in order to acquire proper focusing. In addition, since the micrometers are comparatively delicate in construction, they must be protected from both the heat being generated by the high temperature rod and the possibility of damage in the event that a rolling mishap results in the creation of cobbles. Moreover, micrometer assemblies should be made portable in order to avoid the necessity of positioning individual assemblies at a plurality of points along the pass line. These difficulties are naturally compounded in multi-strand mill operations.

It is therefore an object of the present invention to provide an improved means of positioning a plurality of rod measuring devices such as infrared micrometers closely adjacent to the pass line of a multi-strand rolling mill.

Another object of the present invention is to provide a portable protective micrometer housing capable of being easily moved to alternate positions along the pass line and thereafter quickly positioned with a minimum loss of production time.

A further object of the present invention is to provide a means for adjusting the position of the protective housing to accommodate lateral shifts of the pass line as roll passes are changed.

Another object of the present invention is to provide a means for accurately adjusting each individual micrometer in order to achieve the proper focus.

A further object of the present invention is to provide a means for protecting the infrared micrometers from the heat generated by the high temperature rod and for continuously cleaning the micrometer lenses in order to prevent deposits of foreign matter thereon.

Another object of the present invention is to provide means for protecting the micrometer from cobble damage.

These and other objects of the present invention will become more apparent as the description proceeds with the aid of the accompanying drawings in which:

FIG. 1 is a front elevational view of the infrared micrometer housing according to the present invention looking upstream of the pass line. A portion of one access door has been cut away to provide a clearer view of the micrometers mounted therein;

FIG. 2 is a plan view of FIG. 1 with a top portion of the housing cut away to show the means of connecting the cooling hoses to the common source of pressurized air;

FIG. 3 is a sectional view taken along line 3—3 of FIG. 1;

FIG. 4 is a sectional view taken along line 4—4 of FIG. 1 showing the means of mounting each infrared micrometer within the housing, and;

FIG. 5 is a sectional view taken along line 5—5 of FIGS. 1 and 2.

Referring initially to FIGS. 1-3 wherein are best shown the general features of the applicant's invention, it can be seen that a pair of spaced oppositely disposed vertical support members 10 and 12 are positioned on either side of a two strand pass line and extend upwardly from small rectangular base plates 14. The base plates are in turn secured to the mill floor 16 by any conventional means such as the studs and nuts indicated typically at 18 and 20.

Intermediate inwardly extending support plates 22 are attached as by welding to the upper extremities of the vertical support members 10 and 12 and are provided with longitudinal slots indicated typically at 24. Extending between the intermediate support plates 22 and attached thereto by means of bolts 26 extending through slots 24 is a horizontally disposed channel support 28. Positioned beneath the ends of support member 28 and attached to both plates 22 and vertical support members 10 and 12 are horizontal plates 30 having adjusting screws 32 extending vertically therethrough. The upper ends of the adjusting screws bear against the lower flange of support member 28, thereby providing a means of leveling and vertically adjusting the horizontal member once bolts 26 have been loosened.

An infrared micrometer housing generally indicated by the reference numeral 34 is then movably mounted for lateral displacement on the horizontally extending channel support member 28. The housing is comprised basically of a rear wall 36 having pivotally attached thereto by means of hinges indicated typically at 38 front access doors 40 and 42. It should be understood that the access doors include intermediate sections which serve as the sides and top of the housing when the doors are in a closed position. A latch assembly 44 serves to maintain the doors in the closed position during operation of the mill and when disengaged, permits the doors to be opened to positions indicated by the dotted representations 40a and 42a in FIG. 2.

The lower portion of the housing 34 immediately adjacent the pass line is further enclosed by cobble protecting faces 46 which are attached to the rear wall 36 and sweep outwardly therefrom as shown in FIG. 1 to abut the doors 40 and 42. Each of the cobble faces 46 is additionally provided with micrometer sighting apertures 48 selectively positioned therethrough in order to permit the infrared micrometers contained within the housing to be sighted on the pass lines as will hereinafter be more fully discussed.

The cobble protecting faces 46 are inclined as illustrated in order to obviate the possibility of damage to the enclosed micrometers. More particularly, should the leading end of rod traveling in the direction as indicated in FIGS. 2 and 3 be deflected from its normal path, the possibility of its entering through one of the sighting apertures and damaging the infrared micrometers is completely avoided due to the particular design of the cobble protecting faces. Stated in the alternative, as the stock approaches the rear wall of the housing from a direction as indicated in FIGS. 2 and 3, any deflection from the pass line will cause it to collide with the rear wall of the housing rather than the diverging cobble protecting faces 46. This in turn will avoid the possibility of a leading end entering one of the sighting apertures 48 and thereafter damaging the infrared micrometers.

Having thus described the outer construction of the infrared micrometer housing, the means utilized for removably mounting the housing on the horizontally disposed channel support member 28 will now be discussed. Support rollers 50 are rotatably mounted on axles 52 extending through the rear wall 36 of the housing. As indicated in the drawings, when the housing is in an operative position straddling the pass line, the rollers 50 are supported on the upper flange of horizontally disposed channel member 28. With this construction, the horizontal member 28 will serve as a track on which the support rollers 50 may roll, thereby permitting the entire housing 34 to be laterally adjusted with respect to the pass line. Each support roller 50 is additionally provided with a small protective canopy 54 which is attached to rear wall 36 in order to prevent contamination of the roller bearings by dust, grit, etc.

In order to avoid the possibility of the micrometer housing 34 becoming accidentally disengaged from support member 28, retaining means are provided in the form of upper and lower pairs of stabilizing rollers 56 and 58. As can be best seen in FIG. 5, the upper stabilizing rollers 56 are rotatably mounted on vertically disposed axles 60 extending through angle braces 62 attached to rear wall 36. With this construction, the upper stabilizing rollers cooperate with the rear housing wall 36 in maintaining the housing structure in a rotatably supported position on the horizontally extending channel-type supporting member 28.

The lower stabilizing rollers 58 are rotatably mounted on vertically disposed axles carried by brackets 64 which extend inwardly from the vertical support members 10 and 12. The center of gravity of the housing is so positioned in relation to the support rollers 50 as to cause the rear housing wall 36 to rest against the lower stabilizing rollers 58 as shown in FIG. 3. In this manner, the micrometer housing 34 is securely mounted in a depending position from horizontally disposed channel member 28 during operation of the mill.

Lateral adjustment of the micrometer housing 34 along horizontally disposed supporting member 28 is accomplished manually through the rotation of hand wheel 66. The hand wheel is fixed to one extremity of a rod 68 extending horizontally through a suitably positioned slot 69 in vertical support member 10, the other extremity of the rod being threaded within a nut 70 removably attached to rear housing wall 36 by means of bolts 72. An intermediate portion of rod 68 is journalled within a bearing 74 fixed to channel member 28 in order to provide a means of preventing axial displacement of the rod with respect to the channel member. By turning hand wheel 66, rod 68 is rotated within both bearing 74 and nut 70, thereby causing the housing 34 to be laterally displaced on support rollers 50 along the upper flange of channel support member 28. By turning the hand wheel in either a clockwise or counterclockwise direction, the micrometer housing 34 can be displaced to the right or left as seen in FIG. 1 in order to accommodate groove changes in the rolls.

A plurality of rod measuring devices, herein shown for purposes of illustration in the form of infrared micrometers are positioned within the housing 34. The micrometers will generally be referred to by the reference numeral 76 and will be individually designated in the drawings by the numbers 76a, 76b, 76c, 76d, 76e, 76f, 76g, and 76h. It should of course be understood at this time that the illustrations of the applicant's micrometer housing 34 positioned over a two-strand pass line together with the use of eight infrared micrometers within the housing are intended only as illustrations and not as limitations. The housing may easily be modified to accommodate any number of strands and the number of micrometers positioned therein varied without departing from the spirit and scope of the invention.

As can be best seen in FIG. 1, four of the micrometers (76a, 76b, 76d, 76f) are directed towards one of the strands indicated by the reference numeral 77a. The remaining micrometers (76c, 76e, 76g, 76h) are directed to the second strand 77b. Where the possibility exists that one micrometer may view two strands and thereby emit a faulty reading, as for example in the case of micrometers 76a and 76h, a separating element is provided as indicated at 79. With this arrangement, each strand is continuously measured from a plurality of directions in order to acquire constant and accurate gauge control.

The means for mounting the individual micrometers within the housing 34 will now be described with particular reference to FIG. 4. A micrometer base plate 78 is bolted to rear housing wall 36 by means of bolts indicated typically at 80 and held in spaced relationship therefrom by means of spacer elements 82 interposed therebetween. The infrared micrometer 76 is contained within a casing divided into front and rear portions 84 and 86. The casing portions are held together by means of a plurality of screws indicated typically at 88. The rear casing portion 86 is in turn attached to micrometer base plate 78 by means of upper and lower adjustable bolts 90 and 92. Each of the adjustable bolts are provided with nuts 94 and 96 retained within slots in base plate 78. Nut 96 is capable of vertical displacement within its slot while nut 94 may be both vertically and laterally displaced. With this construction, the following adjustments are made possible: by loosening both upper and lower adjustable bolts 90 and 92, the infrared micrometer 76 contained between casing portions 84 and 86 may be axially displaced towards or away from the pass line at which it is directed in order to achieve the proper focus. In addition, since nut 94 may be laterally displaced within its slot, the entire micrometer may also be pivoted about the axis of lower bolt 98 in order to accurately aim each micrometer at the pass line. Once the micrometer has been properly aimed and focused, both upper and lower adjustable bolts 90 and 92 are tightened to secure the micrometer in place. This having been done, flexible hoses indicated typically by the reference numeral 100 connected at one end through an intermediate plenum chamber 101 to a common source of pressurized filtered cooling air 102 are then connected to each individual micrometer. In this manner, each micrometer is cooled and a flow of air is provided across the micrometer lens in order to constantly remove any dirt or grit that would otherwise be deposited thereon during the mill operation. Moreover, the inside of housing 34 is slightly pressurized by the continuous flow of cooling air, thereby preventing foreign matter from entering through the sighting apertures 48.

Having thus described the principle components of the applicant's invention, its operation will now be reviewed. As shown in the drawings, upwardly disposed lifting eyes 104 are positioned on the housing in order to provide a means of lifting and carrying the housing from one position to the next along the pass line. When the housing is to be moved, the following occurs: the flexible duct 102 carrying filtered pressurized cooling air from a remote source is first disconnected from the plenum chamber 101. Latch 44 is then disengaged and the housing doors 40 and 42 swung to an open position as indicated at 40a and 42a in FIG. 2. The bolts 72 extending through the rear housing wall 36 to attach nut 70 thereto are then removed. By so doing, the lateral adjusting means including the nut 70 and rod 68 are freed from the housing. An overhead crane is then positioned over the housing and hooks attached to the lifting eye 104. This having been done, the micrometers are then electrically disconnected from the control circuit, the housing doors 40 and 42 closed and the housing lifted and carried to an alternate position along the pass line. It should of course be understood that all alternate positions along the pass line will have a set of vertical supports 10 and 12 and a horizontal channel type support member 28 extending therebetween already in place. The housing will then be lowered to its alternate position and the bolts 72 threaded into an existing nut 70. The micrometers are then reconnected to the control system and an alternate supply of cooling air again connected to the plenum chamber 101.

When moving the housing in this manner, it may be necessary to adjust its vertical position when the alternate location is reached. This can easily be accomplished by loosening bolts 26 and adjusting the vertical adjusting screws 32.

It is my invention to cover all changes and modifications of the invention herein chosen for purposes of disclosure which do not depart from the spirit and scope of the invention.

I claim:

1. In a multi-strand rolling mill, means for continuously gauging each strand comprising the combination of: a fixed supporting structure mounted adjacent the pass line; a rod gauge carrying element adjustably mounted on said supporting structure in a position overlying said pass line; means for vertically and horizontally adjusting said rod gauge carrying element on said supporting structure in order to accommodate lateral and vertical shifts of the pass line; a plurality of rod gauging devices protectively mounted within said carrying element; and adjusting means for aiming and focusing each of said gauging devices in order to gauge each of said strands from a plurality of directions.

2. The apparatus as set forth in claim 1 wherein said fixed supporting structure is comprised of opposed vertical standards extending upwardly from the mill floor on either side of the pass line; said vertical standards interconnected at their upper extremities by a horizontally disposed track member overlying and extending transversely to said pass line.

3. In a multi-strand rolling mill, means for continuously gauging each strand comprising the combination of: a fixed supporting structure mounted adjacent the pass line, said supporting structure comprised of opposed vertical standards extending upwardly from the mill floor on on either side of the pass line, said vertical standards interconnected at their upper extremities by a horizontally disposed track member overlying and extending transversely to said pass line; a rod gauge carrying element adjustably mounted on said supporting structure in a position overlying said pass line, said rod gauge carrying element comprising an inverted substantially U-shaped housing depending downwardly from said track member, said housing adjustably mounted by means of at least two track engaging wheels for horizontal movement along said track member in a direction transverse to said pass line; means for horizontally and vertically adjusting said rod gauge carrying element on said supporting structure in order to accommodate lateral and vertical shifts of the pass line; a plurality of rod gauging devices protectively mounted within said carrying elements; and adjusting means for aiming and focusing each of said gauging devices in order to gauge each of said strands from a plurality of directions.

4. The apparatus as set forth in claim 3 further characterized by housing stabilizing means comprising upper rollers rotatably mounted on said housing to engage the sides of said track member, and lower rollers mounted on horizontal supporting members extending inwardly from each of said opposed vertical standards, said lower rollers engaging the lower portion of said housing structure, said upper and lower rollers cooperating to stabilize said housing structure in its depending position from said track member.

5. In a rolling mill, means for continuously gauging a plurality of strands comprising the combination of: a fixed supporting structure mounted adjacent the pass line, said fixed supporting structure comprised of opposed vertical standards extending upwardly from the mill floor on either side of the pass line, said vertical standards interconnected at their upper extremities by a horizontally disposed track member overlying and extending transversely to the pass line; a rod gauge carrying element adjustably mounted on said supporting structure in a position overlying said pass line, said rod gauge carrying element comprising an inverted substantially U-shaped housing depending downwardly from track member, said housing adjustably mounted by means of at least two track engaging wheels for horizontal movement along said track member in a direction transverse to said pass line; means for vertically and horizontally adjusting said rod gauge carrying element on said supporting structure in order to accommodate lateral and vertical shifts of the pass line, said means for horizontally adjusting said gauge carrying element comprising a nut fixed to said housing and having threaded therein one end of a horizontally extending rotatable threaded shaft, the other end of said shaft extending through a bearing fixed to said track member and terminating in a hand wheel, whereby rotation of said hand wheel will cause a corresponding rotation of said shaft within said nut and horizontal displacement of said gauge carrying element along said track member; housing stabilizing means comprising upper rollers rotatably mounted on said housing to engage the sides of said track member, and lower rollers mounted on horizontal supporting members extending inwardly from each of said opposed vertical standards, said lower rollers engaging the lower portion of said housing structure, said upper and lower rollers cooperating to stabilize said housing structure in its depending position from said track member; a plurality of rod gauging devices protectively mounted within said carrying element; and adjusting means for aiming and focusing each of said gauging devices in order to gauge each of said strands from a plurality of directions.

6. The apparatus as set forth in claim 5 wherein said rod gauging devices are comprised of infrared micrometers adjustable within said housing.

7. In a multi-strand rolling mill, means for continuously gauging each strand comprising the combination of: a fixed supporting structure mounted adjacent the pass line, said supporting structure comprised of opposed vertical standards extending upwardly from the mill floor on either side of the pass line, said vertical standards interconnected at their upper extremities by horizontally disposed track member overlying and extending transversely to said pass line; a rod gauge carrying element adjustably mounted on said supporting structure in a position overlying said pass line, said gauge carrying element comprising an inverted substantially U-shaped housing depending downwardly from said track member, said housing adjustably mounted by means of at least two track engaging wheels for horizontal movement along said track member in a direction transverse to said pass line; means for vertically and horizontally adjusting said rod gauge carrying element on said supporting structure in order to accommodate lateral and vertical shifts of the pass line, said means for horizontally adjusting said gauge carrying element comprising a nut fixed to said housing and having threaded therein one end of a horizontally extending rotatable threaded shaft, the other end of said shaft extending through bearing means fixed to said track member to terminate in a hand wheel, whereby rotation of said hand wheel will cause a corresponding rotation of said shaft within said nut and horizontal displacement of said gauge carrying element along said track member; housing stabilizing means comprising upper rollers rotatably mounted on said housing to engage the sides of said track members, and lower rollers mounted on horizontal supporting members extending inwardly from each of said opposed vertical standards, said lower rollers engaging the lower portion of said housing structure, said upper and lower rollers cooperating to stabilize said housing structure in a depending position from said track member; a plurality of rod gauging devices protectively mounted within said carrying element, said rod gauging devices comprised of individual infrared micrometers adjustably mounted within said housing; adjusting means for aiming and focusing each of said gauging devices in order to gauge each of said strands from a plurality of directions; and means for cooling said micrometers and preventing environmental contaminants from being deposited on the lens thereof, said means comprising a conduit leading from a remote source of filtered pressurized cooling air to said housing, and a plurality of flexible hoses contained within said housing, said hoses leading from said conduit to each of said infrared micrometers, whereby each of said micrometers is cooled and an air flow is directed there across in order to prevent deposits of environmental contaminants thereon.

8. In a multi-strand rolling mill, means for continuously gauging each of said strands at one of several preselected points along the pass line comprising the combination of: fixed supporting structures mounted adjacent the pass line at each of said preselected points; a rod gauge carrying element suitably designed to be removably mounted on any one of said fixed supporting structures, said rod gauge carrying element mounted on one of said supporting structures in a position overlying the pass line; means for vertically and horizontally adjusting said rod gauge carrying element on said supporting structure in order to accommodate lateral and vertical shifts of the pass line; a plurality of rod gauging devices protectively mounted within said carrying element; adjusting means for aiming and focusing each of said gauging devices in order to gauge each of said strands from a plurality of directions; and means for removing and transporting said rod gauge carrying element from one fixed supporting structure to the next in order to provide a means of gauging said strands at each of said preselected points along the pass line.

References Cited by the Examiner
UNITED STATES PATENTS

| | | | |
|---|---|---|---|
| 2,576,614 | 11/1951 | Lewellen | 72—16 |
| 2,660,077 | 11/1953 | Macaulay | 72—16 |
| 2,933,956 | 4/1960 | Snow | 72—240 |
| 3,225,202 | 12/1965 | Rich | 72—12 |

CHARLES W. LANHAM, *Primary Examiner.*
G. P. CROSBY, *Assistant Examiner.*